Sept. 5, 1950 G. C. B. LISTER ET AL 2,521,071
AUTOMATIC ALIGNING DEVICE FOR ENDLESS BANDS
Filed Jan. 27, 1948

INVENTORS,
GEORGE CHARLES BUTLIN LISTER & THOMAS EDWARD WALSH
By John Irwin ATTORNEY

UNITED STATES PATENT OFFICE 2,521,071

AUTOMATIC ALIGNING DEVICE FOR ENDLESS BANDS

George Charles Butlin Lister and Thomas Edward Walsh, London, England

Application January 27, 1948, Serial No. 4,528
In Great Britain October 14, 1946

Section 1, Public Law 690, August 8, 1946
Patent expires October 14, 1966

3 Claims. (Cl. 74—241)

The invention relates to an automatic apparatus for aligning conveyor belts or endless bands or belts for other apparatus.

According to the invention a roller or pulley round which a belt or endless band passes is mounted to rotate in bearings carried by arms which are pivotally mounted and adapted to engage with the sides of the belt so that, should the belt tend to move to one side, the adjacent arm is moved about its fulcrum, with the result that the roller or pulley is automatically advanced on that side and retracted on the other side. This tightens the belt on that side and slackens it on the other side. As a belt tends to run towards its "slack" side the above movement corrects the position of the belt which is maintained in its central or aligned position.

The arms are preferably linked together or otherwise adapted to act in unison and also preferably provided with rollers, or other anti-friction surfaces to avoid wear of the edges of the belt.

While the invention is particularly applicable to conveyor belts it may be applied to other apparatus in which a belt or endless band has to be maintained in alignment.

In the accompanying drawings—

Figure 1:
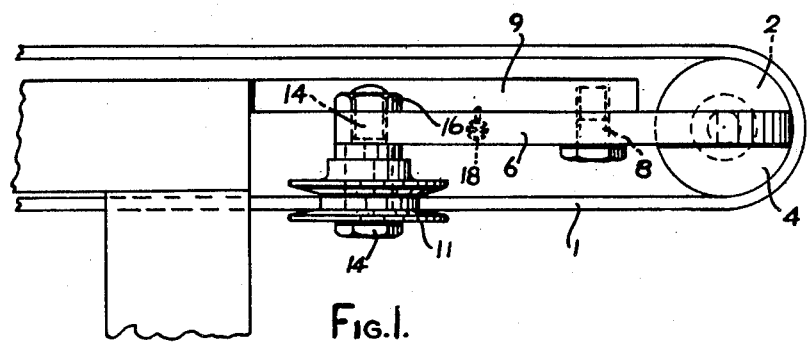
Figure 2:
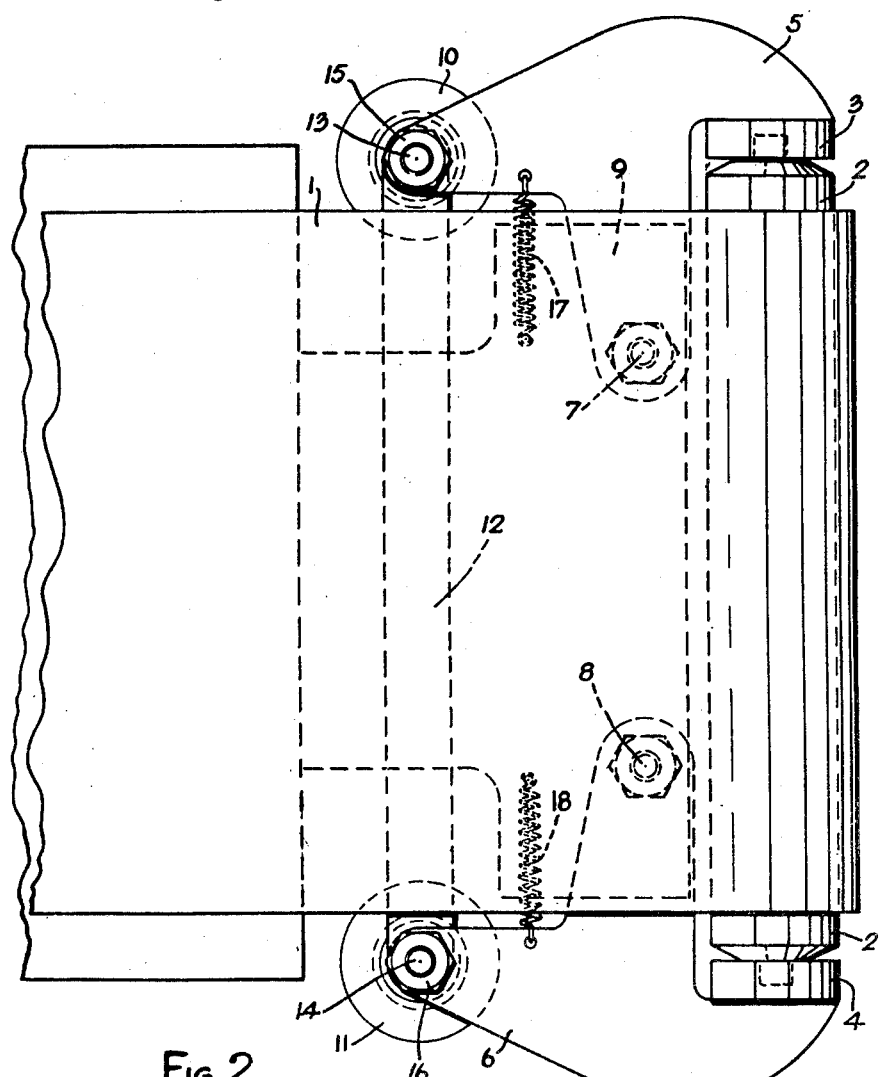

Figures 1 and 2 are, respectively, a side view and a plan of one form of belt aligning apparatus according to the invention.

In one example, as applied to a conveyor belt 1, a roller or pulley 2 round which the belt passes, is mounted to rotate freely in bearings 3 and 4 formed on two outer end arms or levers 5 and 6 of a pair of three-armed levers having intermediate inwardly extending arms between the belt or band strands, laps or runs, which are mounted to oscillate on fulcrum pins 7 and 8 fixed in a stationary frame 9 situated and held between the two strands of the belt.

The levers 5 and 6 have anti-friction rollers 10 and 11 on their inner end arms in engagement with the adjacent side edges of the lower strand of the belt 1.

The two arms 5 and 6 are connected by a connecting link 12 conveniently on the journal pins 13 and 14 of the anti-friction rollers 10 and 11, the ends of arms 5 and 6 being drilled and tapped to receive the journal pins which are screw threaded at their ends for nuts 15 and 16. The anti-friction rollers 10 and 11 are shaped to suit the belt with which they engage, for instance, they may be flanged or grooved peripherally as in the example illustrated to preclude displacement of said rollers or pulleys from the belt strand edges or vice versa. They rotate freely on the journal pins and their bosses are provided with oil holes or lubricators.

Should it not be convenient to link the arms or levers together they may be mounted to oscillater independently, but springs, such as indicated at 17 and 18, which may be connected to the lever arms between rollers 10 and 11 and fulcrum pins 7 and 8, and to the frame 9, are provided to hold them with the rollers 10 and 11 in contact with the belt and thereby to ensure that the levers act in unison to adjust the belt roller or pulley, so as to maintain alignment of the belt.

We claim:

1. Automatic endless-belt aligning apparatus comprising, a roller for engagement within one end loop of the endless belt, bearings for the ends of said roller, three-armed levers adjacent to the sides of the endless belt between the strands thereof, said levers carrying the aforesaid bearings for the roller and also carrying anti-friction means for contact with the sides of the belt, fulcra for said levers situated within the loop of the belt intermediate of the bearings and of said anti-friction means, and fixed means for supporting said fulcra, for the purpose of allowing said levers to rock about said fulcra under the influence of the belt acting through said anti-friction means so that said roller is advanced and thrust against the loop on one side and retracted on the other and consequently tightens the belt on that side and slackens it on the other to cause the belt to assume its correct central or aligned position.

2. An automatic endless-belt aligning apparatus as specified in claim 1, including a link directly connecting said levers adjacent said anti-friction means for ensuring movement of the levers in unison.

3. Automatic endless-belt aligning apparatus comprising, a roller for engagement within one end loop of the endless belt, bearings for said roller, levers adjacent to the sides of the endless belt, said levers carrying the aforesaid bearings for the roller and also carrying anti-friction means for contact with the sides of the belt, fulcra for said levers situated within the loop of the belt intermediate of the bearings and of said anti-friction means, fixed means for supporting said fulcra, for the purpose of allowing said levers to rock about said fulcra under the influence of the belt acting through said anti-friction means so that said roller is advanced and thrust against the loop on one side and retracted on the other and consequently tightens the belt on that side and slackens it on the other to cause the belt to assume its correct central or aligned position, and springs between said levers and said fulcra supporting means and biasing said levers toward each other for maintaining the levers with their anti-friction means in contact with the sides of the belt and thereby to ensure movement of said levers in unison.

GEORGE CHARLES BUTLIN LISTER.
THOMAS EDWARD WALSH.

REFERENCES CITED

The following references are of record in the file of this patent:

UNITED STATES PATENTS

| Number | Name | Date |
|---|---|---|
| 432,993 | Ensign | July 29, 1890 |
| 992,568 | Loutensock | May 16, 1911 |
| 1,545,309 | Davis et al. | July 7, 1925 |
| 1,628,614 | Ross | May 10, 1927 |